(12) United States Patent
Engelberg et al.

(10) Patent No.: US 11,880,250 B2
(45) Date of Patent: Jan. 23, 2024

(54) OPTIMIZING ENERGY CONSUMPTION OF PRODUCTION LINES USING INTELLIGENT DIGITAL TWINS

(71) Applicant: Accenture Global Solutions Limited, Dublin (IE)

(72) Inventors: Gal Engelberg, Pardes-hana (IL); Eitan Hadar, Nesher (IL); Laura Mosconi, Rome (IT); Stefano Giacco, Amantea (IT)

(73) Assignee: Accenture Global Solutions Limited, Dublin (IE)

( * ) Notice: Subject to any disclaimer, the term of this patent is extended or adjusted under 35 U.S.C. 154(b) by 21 days.

(21) Appl. No.: 17/814,045

(22) Filed: Jul. 21, 2022

(65) Prior Publication Data
US 2023/0021961 A1 Jan. 26, 2023

Related U.S. Application Data

(60) Provisional application No. 63/224,130, filed on Jul. 21, 2021.

(51) Int. Cl.
*G06F 1/26* (2006.01)
*G06F 1/32* (2019.01)
(Continued)

(52) U.S. Cl.
CPC .................. *G06F 1/26* (2013.01); *G06F 1/32* (2013.01); *G06Q 10/06* (2013.01); *G06Q 50/04* (2013.01); *G06Q 50/06* (2013.01); *Y02P 80/10* (2015.11)

(58) Field of Classification Search
CPC .. G06F 1/26; G06F 1/32; G06Q 10/06; G06Q 50/04; G06Q 50/06; Y02P 80/10
See application file for complete search history.

(56) References Cited

U.S. PATENT DOCUMENTS

| 5,521,910 A | 5/1996 | Matthews |
| 6,279,113 B1 | 8/2001 | Vaidya |

(Continued)

FOREIGN PATENT DOCUMENTS

| EP | 1559008 | 8/2005 |
| EP | 1768043 | 3/2007 |

(Continued)

OTHER PUBLICATIONS

EP Extended Search Report in European Appln. No. 22193272.6, dated Jan. 25, 2023, 8 pages.

(Continued)

*Primary Examiner* — Terrell S Johnson
(74) *Attorney, Agent, or Firm* — Fish & Richardson P.C.

(57) ABSTRACT

Methods, systems, and computer-readable storage media for receiving data representative of a physical entity, generating an initial knowledge graph representative of a process that is executed by the physical entity based on the data, enriching the initial knowledge graph to provide a process aware energy consumption (PAEC) digital twin of the process as an enriched knowledge graph, providing at least two permutations based on the PAEC digital twin, executing analytics at least partially based on the at least two permutations to provide one or more recommendations, and executing at least one recommendation to optimize energy consumption of the physical entity.

20 Claims, 6 Drawing Sheets

(51) Int. Cl.
 *G06Q 10/06* (2023.01)
 *G06Q 50/04* (2012.01)
 *G06Q 50/06* (2012.01)

(56) References Cited

U.S. PATENT DOCUMENTS

| | | |
|---|---|---|
| 6,487,666 B1 | 11/2002 | Shanklin et al. |
| 7,540,025 B2 | 5/2009 | Tzadikario |
| 7,703,138 B2 | 4/2010 | Desai et al. |
| 7,904,962 B1 | 3/2011 | Jajodia et al. |
| 8,099,760 B2 | 1/2012 | Cohen et al. |
| 8,176,561 B1 | 5/2012 | Hurst et al. |
| 8,656,493 B2 | 2/2014 | Capalik |
| 8,881,288 B1 | 11/2014 | Levy et al. |
| 9,256,739 B1 | 2/2016 | Roundy et al. |
| 9,563,771 B2 | 2/2017 | Lang et al. |
| 9,633,306 B2 | 4/2017 | Liu et al. |
| 10,084,804 B2 | 9/2018 | Kapadia et al. |
| 10,291,645 B1 | 5/2019 | Frantzen et al. |
| 10,382,473 B1 | 8/2019 | Ashkenazy et al. |
| 10,447,721 B2 | 10/2019 | Lasser |
| 10,447,727 B1 | 10/2019 | Hecht |
| 10,601,854 B2 | 3/2020 | Lokamathe et al. |
| 10,642,840 B1 | 5/2020 | Attaluri et al. |
| 10,659,488 B1 | 5/2020 | Rajasooriya et al. |
| 10,771,492 B2 | 9/2020 | Hudis et al. |
| 10,848,515 B1 | 11/2020 | Pokhrel et al. |
| 10,868,825 B1 | 12/2020 | Dominessy et al. |
| 10,873,533 B1 | 12/2020 | Ismailsheriff et al. |
| 10,956,566 B2 | 3/2021 | Shu et al. |
| 10,958,667 B1 | 3/2021 | Maida et al. |
| 11,089,040 B2 | 8/2021 | Jang et al. |
| 11,128,654 B1 | 9/2021 | Joyce et al. |
| 11,159,555 B2 | 10/2021 | Hadar et al. |
| 11,184,385 B2 | 11/2021 | Hadar et al. |
| 11,232,235 B2 | 1/2022 | Hadar et al. |
| 11,277,431 B2 | 3/2022 | Hassanzadeh et al. |
| 11,281,806 B2 | 3/2022 | Hadar et al. |
| 11,283,824 B1 | 3/2022 | Berger et al. |
| 11,283,825 B2 | 3/2022 | Grabois et al. |
| 11,411,976 B2 | 8/2022 | Basovskiy et al. |
| 11,483,213 B2 | 10/2022 | Engelberg et al. |
| 11,533,332 B2 | 12/2022 | Engelberg et al. |
| 2005/0138413 A1 | 6/2005 | Lippmann et al. |
| 2005/0193430 A1 | 9/2005 | Cohen et al. |
| 2006/0037077 A1 | 2/2006 | Gadde et al. |
| 2008/0044018 A1 | 2/2008 | Scrimsher et al. |
| 2008/0289039 A1 | 11/2008 | Rits et al. |
| 2008/0301765 A1 | 12/2008 | Nicol et al. |
| 2009/0077666 A1 | 3/2009 | Chen et al. |
| 2009/0138590 A1 | 5/2009 | Lee et al. |
| 2009/0307772 A1 | 12/2009 | Markham et al. |
| 2009/0319248 A1 | 12/2009 | White et al. |
| 2010/0058456 A1 | 3/2010 | Jajodia et al. |
| 2010/0138925 A1 | 7/2010 | Barai et al. |
| 2010/0174670 A1 | 7/2010 | Malik et al. |
| 2011/0035803 A1 | 2/2011 | Lucangeli Obes et al. |
| 2011/0061104 A1 | 3/2011 | Sarraute Yamada et al. |
| 2011/0093916 A1 | 4/2011 | Lang et al. |
| 2011/0093956 A1 | 4/2011 | Laarakkers et al. |
| 2013/0097125 A1 | 4/2013 | Marvasti et al. |
| 2013/0219503 A1 | 8/2013 | Amnon et al. |
| 2014/0082738 A1 | 3/2014 | Bahl |
| 2014/0143179 A1* | 5/2014 | Takaoka ............... G06Q 10/04 705/412 |
| 2014/0173740 A1 | 6/2014 | Albanese et al. |
| 2015/0047026 A1 | 2/2015 | Neil et al. |
| 2015/0106867 A1 | 4/2015 | Liang |
| 2015/0199207 A1 | 7/2015 | Lin et al. |
| 2015/0261958 A1 | 9/2015 | Hale et al. |
| 2015/0326601 A1 | 11/2015 | Grondin et al. |
| 2015/0350018 A1 | 12/2015 | Hui et al. |
| 2016/0105454 A1 | 4/2016 | Li et al. |
| 2016/0205122 A1 | 7/2016 | Bassett |
| 2016/0277423 A1 | 9/2016 | Apostolescu et al. |
| 2016/0292599 A1 | 10/2016 | Andrews et al. |
| 2016/0301704 A1 | 10/2016 | Hassanzadeh et al. |
| 2016/0301709 A1 | 10/2016 | Hassanzadeh et al. |
| 2017/0012836 A1 | 1/2017 | Tongaonkar et al. |
| 2017/0032130 A1 | 2/2017 | Joseph et al. |
| 2017/0041334 A1 | 2/2017 | Kahn et al. |
| 2017/0078322 A1 | 3/2017 | Seiver et al. |
| 2017/0085595 A1 | 3/2017 | Ng et al. |
| 2017/0163506 A1 | 6/2017 | Keller |
| 2017/0230410 A1 | 8/2017 | Hassanzadeh et al. |
| 2017/0318050 A1 | 11/2017 | Hassanzadeh et al. |
| 2017/0324768 A1 | 11/2017 | Crabtree et al. |
| 2017/0364702 A1 | 12/2017 | Goldfarb et al. |
| 2017/0366416 A1 | 12/2017 | Beecham et al. |
| 2018/0013771 A1 | 1/2018 | Crabtree et al. |
| 2018/0103052 A1 | 4/2018 | Choudhury et al. |
| 2018/0152468 A1 | 5/2018 | Nor et al. |
| 2018/0159890 A1 | 6/2018 | Warnick et al. |
| 2018/0183827 A1 | 6/2018 | Zorlular et al. |
| 2018/0255077 A1 | 9/2018 | Paine |
| 2018/0255080 A1 | 9/2018 | Paine |
| 2018/0295154 A1 | 10/2018 | Crabtree et al. |
| 2018/0367548 A1 | 12/2018 | Stokes, III et al. |
| 2019/0052663 A1 | 2/2019 | Lee et al. |
| 2019/0052664 A1 | 2/2019 | Kibler et al. |
| 2019/0132344 A1 | 5/2019 | Lem et al. |
| 2019/0141058 A1 | 5/2019 | Hassanzadeh et al. |
| 2019/0182119 A1 | 6/2019 | Ratkovic et al. |
| 2019/0188389 A1 | 6/2019 | Peled et al. |
| 2019/0230129 A1 | 7/2019 | Digiambattista et al. |
| 2019/0312898 A1 | 10/2019 | Verma et al. |
| 2019/0319987 A1 | 10/2019 | Levy et al. |
| 2019/0362279 A1 | 11/2019 | Douglas |
| 2019/0373005 A1 | 12/2019 | Bassett |
| 2020/0014718 A1 | 1/2020 | Durairaj et al. |
| 2020/0042328 A1 | 2/2020 | Gupta |
| 2020/0042712 A1 | 2/2020 | Foo et al. |
| 2020/0045069 A1 | 2/2020 | Nanda et al. |
| 2020/0099704 A1 | 3/2020 | Lee et al. |
| 2020/0112487 A1 | 4/2020 | Inamdar et al. |
| 2020/0128047 A1 | 4/2020 | Biswas et al. |
| 2020/0137104 A1 | 4/2020 | Hassanzadeh et al. |
| 2020/0175175 A1 | 6/2020 | Hadar et al. |
| 2020/0177615 A1 | 6/2020 | Grabois et al. |
| 2020/0177616 A1 | 6/2020 | Hadar et al. |
| 2020/0177617 A1 | 6/2020 | Hadar et al. |
| 2020/0177618 A1 | 6/2020 | Hassanzadeh et al. |
| 2020/0177619 A1 | 6/2020 | Hadar et al. |
| 2020/0272972 A1 | 8/2020 | Harry et al. |
| 2020/0296137 A1 | 9/2020 | Crabtree et al. |
| 2020/0311630 A1 | 10/2020 | Risoldi et al. |
| 2020/0351295 A1 | 11/2020 | Nhlabatsi et al. |
| 2020/0358804 A1 | 11/2020 | Crabtree et al. |
| 2021/0006582 A1 | 1/2021 | Yamada et al. |
| 2021/0014265 A1 | 1/2021 | Hadar et al. |
| 2021/0099490 A1 | 4/2021 | Crabtree et al. |
| 2021/0105294 A1 | 4/2021 | Kruse et al. |
| 2021/0168175 A1 | 6/2021 | Crabtree et al. |
| 2021/0173711 A1 | 6/2021 | Crabtree et al. |
| 2021/0218770 A1 | 7/2021 | Ben-Yosef et al. |
| 2021/0241392 A1* | 8/2021 | Tiwari ............... G06Q 50/08 |
| 2021/0248443 A1 | 8/2021 | Shu et al. |
| 2021/0273978 A1 | 9/2021 | Hadar et al. |
| 2021/0288995 A1 | 9/2021 | Attar et al. |
| 2021/0336981 A1 | 10/2021 | Akella et al. |
| 2021/0409426 A1 | 12/2021 | Engelberg et al. |
| 2021/0409439 A1 | 12/2021 | Engelberg et al. |
| 2022/0014445 A1 | 1/2022 | Engelberg et al. |
| 2022/0014534 A1 | 1/2022 | Basovskiy et al. |
| 2022/0021698 A1 | 1/2022 | Hadar et al. |
| 2022/0038491 A1 | 2/2022 | Hadar et al. |
| 2022/0051111 A1 | 2/2022 | Hadar et al. |
| 2022/0070202 A1 | 3/2022 | Busany et al. |
| 2022/0124115 A1 | 4/2022 | Grabois et al. |
| 2022/0129590 A1 | 4/2022 | Hadar et al. |
| 2022/0131894 A1 | 4/2022 | Hassanzadeh et al. |
| 2022/0150270 A1 | 5/2022 | Klein et al. |
| 2022/0182406 A1 | 6/2022 | Inokuchi |
| 2022/0188460 A1 | 6/2022 | Hadar et al. |

(56) References Cited

U.S. PATENT DOCUMENTS

| | | | |
|---|---|---|---|
| 2022/0263855 A1 | 8/2022 | Engelberg et al. | |
| 2022/0337617 A1 | 10/2022 | Basovskiy et al. | |
| 2022/0342401 A1* | 10/2022 | Dunigan | G05B 23/0294 |
| 2023/0034910 A1 | 2/2023 | Engelberg et al. | |
| 2023/0067128 A1 | 3/2023 | Engelberg et al. | |
| 2023/0067777 A1 | 3/2023 | Hadar et al. | |
| 2023/0076372 A1 | 3/2023 | Engelberg et al. | |

FOREIGN PATENT DOCUMENTS

| | | |
|---|---|---|
| EP | 2385676 | 11/2011 |
| EP | 2816773 | 12/2014 |
| EP | 3644579 | 4/2020 |
| EP | 3664411 | 6/2020 |
| WO | WO 2018/002484 | 1/2018 |
| WO | WO 2020/242275 | 12/2020 |

OTHER PUBLICATIONS

3DS.com [online], "New Customer Experience," available on or before Aug. 7, 2020 via Internet Archive: Wayback Machine URL<https://web.archive.org/web/20200807204455/https://ifwe.3ds.com/transportation-mobility/new-customer-experience>, retrieved on Jul. 9, 2021, retrieved from URL<https://ifwe.3ds.com/transportation-mobility/new-customer-experience>, 9 pages.

Abraham et al. "A Predictive Framework for Cyber Security Analytics Using Attack Graphs." International Journal of Computer Networks & Communications (IJCNC). vol. 7, No. 1, Jan. 2015. (Year: 2015).

Abraham et al., "Cyber Security Analytics: A Stochastic Model for Security Quantification Using Absorbing Markov Chains," Journal of Communications, Dec. 2014, 9(12): 899-907.

Almeida et al., "An ontological analysis of the notion of community in the RM-ODP enterprise language," Computer Standards & Interfaces, Mar. 2013, 35(3):257-268.

Alvarenga et al., "Discovering Attack Strategies Using Process Mining," Presented at Proceedings of The Eleventh Advanced International Conference on Telecommunications, Brussels, Belgium, Jun. 21-26, 2015, 119-125.

Amar et al., "Using finite-state models for log differencing," Proceedings of the 2018 26th ACM Joint Meeting on European Software Engineering Conference and Symposium on the Foundations of Software Engineering (ESEC/FSE 2018), Lake Buena Vista, Florida, Nov. 4-9, 2018, 49-59.

Annane et al., "BBO: BPMN 2.0 based ontology for business process representation," Presented at Proceedings of the 20th European Conference on Knowledge Management (ECKM 2019), Lisbonne, Portugal, Sep. 5-6, 2019, 49-59.

Ashton et al., "That 'internet of things' thing, " RFID Journal, Jun. 22, 2009, 1 page.

Atoum et al., "A holistic cyber security implementation framework," Information Management & Computer Security, Jul. 2014, 22(3):251-264.

Barik et al., "Attack Graph Generation and Analysis Techniques," Defence Science Journal, Nov. 2016, 66(6):559-567.

Barrère et al., "Naggen: a Network Attack Graph GENeration Tool—IEE CNS 17 Poster," 2017 IEEE Conference on Communications and Network Security, Oct. 2017, Las Vegas, NV, USA, 378-379.

Bonacich, "Power and Centrality: A Family of Measures," American Journal of Sociology, Mar. 1987, 92(5):1170-1182.

Borgatti et al., "A Graph-theoretic perspective on centrality," Social Networks, Oct. 2006, 28(4):466-484.

Borgo et al., "Ontological Foundations of DOLCE," Theory and Applications of Ontology: Computer Applications, Aug. 5, 2010, 279-295.

Brazhuk, "Towards automation of threat modeling based on a semantic model of attack patterns and weaknesses," arXiv, Dec. 8, 2021, arXiv:2112.04231v1, 14 pages.

Burger et al., "Scaling to the end of silicon with edge architectures," Computer, Jul. 2004, 37(7):44-55.

Challenge.org [online], "Incorporating digital twin into internet cyber security—creating a safer future," May 2018, retrieved on Jul. 9, 2021, retrieved from URL<https://www.challenge.org/insights/digital-twin-cyber-security/>, 10 pages.

Chen et al., "Distributed Attack Modeling Approach Based on Process Mining and Graph Segmentation," Entropy, Sep. 2020, 22(9):1026, 21 pages.

Cohen-Addad et al., "Hierarchical Clustering: Objective Functions and Algorithms," Journal of the ACM, Jun. 2019, 66(4):26, 42 pages.

Coltellese et al., Triage of IoT Attacks Through Process Mining, Presented at Proceedings of on the Move to Meaningful Internet Systems Conference 2019, Rhodes, Greece, Oct. 21-25, 2019; Lecture Notes in Computer Science, Oct. 2019, 11877:326-344.

Cravero, "Big data architectures and the internet of things: A systematic mapping study," IEEE Latin America Transactions, Apr. 2018, 16(4):1219-1226.

CyberSecurity Works.com [online], "MITRE Mapping of CISA KEVs and its Challenges," Jun. 29, 2022, retrieved on Oct. 4, 2022, retrieved from URL<https://cybersecurityworks.com/blog/cisa/mitre-mapping-of-cisa-kevs-and-its-challenges.html>, 6 pages.

Cycognito.com [online], "Identifying and Managing Vulnerabilities on All Your Attacker-Exposed Assets, All the Time: Benefits of the CyCognito Platform for Vulnerability Management," available on or before Oct. 22, 2020 via Internet Archive: Wayback Machine URL<https://web.archive.org/web/20201022120625/https://www.cycognito.com/vulnerability-management>, retrieved on Oct. 4, 2022, retrieved from URL<https://www.cycognito.com/vulnerability-management>, 15 pages.

Daniele et al., "An ontological approach to logistics," Enterprise Interoperability: Research and Applications in the Service-oriented Ecosystem, Oct. 11, 2013, 199-213.

Das et al., "V2W-BERT: A Framework for Effective Hierarchical Multiclass Classification of Software Vulnerabilities," CoRR, submitted on Feb. 23, 2021, arXiv:2102.11498v1, 11 pages.

Degen et al., "Gol: toward an axiomatized upper-level ontology," Presented at Proceedings of the International Conference on Formal Ontology in Information Systems, Ogunquit, Maine, USA, Oct. 17-19, 2001, 34-46.

Duarte et al., "Towards an Ontology of Requirements at Runtime," Formal Ontology in Information Systems, Jan. 2016, 283:255-268.

El Saddik, "Digital Twins: The Convergence of Multimedia Technologies," IEEE MultiMedia, Apr.-Jun. 2018, 25(2):87-92.

EP Extended Search Report in European Appln. No. 21191752.1, dated Jan. 4, 2022, 8 pages.

EP Extended Search Report in European Appln. No. 22157487.4, dated Jun. 9, 2022, 10 pages.

EP Search Report in European Application No. EP 19212981, dated Mar. 4, 2020, 6 pages.

EP Search Report in European Application No. EP13290145, dated Nov. 12, 2013, 2 pages.

EP Search Report in European Application No. EP19212974, dated Feb. 14, 2020, 8 pages.

EP Search Report in European Application No. EP19212976, dated Feb. 14, 2020, 8 pages.

EP Search Report in European Application. No. 21159421.3, dated Jun. 30, 2021, 11 pages.

EP Search Report in European Application. No. EP20185251, dated Oct. 21, 2020, 7 pages.

Fielder et al., "Decision support approaches for cyber security investment," Decision Support Systems, Jun. 2016, 86:13-23.

Foundations of Databases, 1st ed., Abiteboul et al. (eds.), 1995, Chapter 12, 38 pages.

Fundamentals of Business Process Management, 2nd ed., Dumas et al. (eds.), 2018, 546 pages.

Gailly et al., "Ontological Reengineering of the REA-EO using UFO," Presented at Proceedings of the International Workshop on Ontology-Driven Software Engineering, Orlando, FL, USA, Oct. 2009, 15 pages.

(56) References Cited

OTHER PUBLICATIONS

Gandomi et al., "Beyond the hype: Big data concepts, methods, and analytics," International Journal of Information Management, Apr. 2015, 35(2):137-144.

GE.com [online], "Predix Platform," available on or before Nov. 16, 2018 via Internet Archive: Wayback Machine URL<https://web.archive.org/web/20181116005032/https://www.ge.com/digital/iiot-platform>, retrieved on Jul. 9, 2021, retrieved from URL<https://www.ge.com/digital/iiot-platform>, 6 pages.

Genovese, "Data mesh: the newest paradigm shift for a distributed architecture in the data world and its application," Thesis for the degree of Computer Engineering, Politecnico di Torino, 2021, 76 pages.

Gergeleit et al., "Modeling Security Requirements and Controls for an Automated Deployment of Industrial IT Systems," Kommunikation und Bildverarbeitung in der Automation. Technologien für die intelligente Automation (Technologies for Intelligent Automation), Jan. 14, 2020, 12:217-231.

GitHub.com [online], "ALFA-group/BRON," available on or before Nov. 23, 2021 via Internet Archive: Wayback Machine URL<https://web.archive.org/web/20211123023700/https://github.com/ALFA-group/BRON>, retrieved on Oct. 4, 2022, retrieved from URL<https://github.com/ALFA-group/BRON>, 5 pages.

Giunchiglia et al., "Lightweight Ontologies," Technical Report DIT-07-071, University of Trento, Oct. 2007, 10 pages.

Gomez-Perez et al., "Ontology languages for the Semantic Web," IEEE Intelligent Systems, Feb. 2002, 17(1):54-60.

Grieves, "Virtually Intelligent Product Systems: Digital and Physical Twins", Complex Systems Engineering: Theory and Practice, Jul. 2019, 256:175-200.

Grigorescu et al., "CVE2ATT&CK: BERT-Based Mapping of CVEs to Mitre Att&Ck Techniques," Algorithms, Aug. 31, 2022, 15(9):314, 22 pages.

Guarino, "Formal Ontology in Information Systems," Presented at Proceedings of the 1st International Conference, Trento, Italy, Jun. 6-8, 1998, 3-15.

Guizzardi et al., "An Ontology-Based Approach for Evaluating the Domain Appropriateness and Comprehensibility Appropriateness of Modeling Languages," MoDELS, 2005, 691-705.

Guizzardi, "On Ontology, ontologies, Conceptualizations, Modeling Languages, and (Meta)Models," Presented at Proceedings of the 2007 conference on Databases and Information Systems IV: Selected Papers from the Seventh International Baltic Conference, Amsterdam, Netherlands, Jun. 5, 2007, 18 pages.

Guizzardi, "Ontological Foundations for Structural Conceptual Models," Thesis for the degree of Doctor, University of Twente, 2005, 441 pages.

Guizzardi, "Ontology, Ontologies and the "I" of FAIR," Data Intelligence, Jan. 1, 2020, 2(1-2):181-191.

Guizzardi, "The role of foundational ontology for conceptual modeling and domain ontology representation," Presented at Proceedings of the 7th International Baltic Conference on Databases and Information Systems, Vilnius, Lithuania, Jul. 3-6, 2006, 9 pages.

Hadar et al., "Big Data Analytics on Cyber Attack Graphs for Prioritizing Agile Security Requirements", Proceedings of the 2019 IEEE 27th International Requirements Engineering Conference, Sep. 23-27, 2019, Jeju Island, Kora, 330-339.

Hadar et al., "Cyber Digital Twin Simulator for Automatic Gathering and Prioritization of Security Controls Requirements," Proceedings of the 2020 IEEE 28th International Requirements Engineering Conference, Aug. 31-Sep. 4, 2020, Zurich, Switzerland, 250-259.

Hansen et al., "Model-in-the-Loop and Software-in-the-Loop Testing of Closed-Loop Automotive Software with Arttest," Informatik, 2017, 13 pages.

Hasan et al., "Towards Optimal Cyber Defense Remediation in Energy Delivery Systems", Proceedings of 2019 IEEE Global Communications Conference, Dec. 9-13, 2019, Waikoloa, Hawaii, 7 pages.

Hassani et al., "Artificial Intelligence (AI) or Intelligence Augmentation (IA): What is the Future?," AI, Apr. 12, 2020, 1(2):143-155.

Hemberg et al., "BRON—Linking Attack Tactics, Techniques, and Patterns with Defensive Weaknesses, Vulnerabilities and Affected Platform Configurations," arXiv, Oct. 1, 2020, arXiv:2010.00533v1, 14 pages.

Hemberg et al., "Using a Collated Cybersecurity Dataset for Machine Learning and Artificial Intelligence," arXiv, Aug. 5, 2021, arXiv:2108.02618v1, 5 pages.

Herre, "General Formal Ontology (GFO): A Foundational Ontology for Conceptual Modelling," Theory and Applications of Ontology: Computer Applications, Aug. 12, 2010, 297-345.

Hofner et al., "Dijkstra, Floyd and Warshall meet Kleene," Formal Aspects of Computing, Jul. 2012, 24(4-6):459-476.

Horrocks et al., "SWRL: A Semantic Web Rule Language Combining OWL and RuleML," W3C Member Submission, May 21, 2004, 24 pages.

Husák et al., "Survey of Attack Projection, Prediction, and Forecasting in Cyber Security," IEEE Communications Surveys & Tutorials, Sep. 24, 2018, 21(1):640-660.

Idika et al., "Extending attack graph-based security metrics and aggregating their application," IEEE Transactions on Dependable and Secure Computing, Jan./Feb. 2012, 9(1):75-85.

IEEE, "IEEE Standard for extensible Event Stream (XES) for Achieving Interoperability in Event Logs and Event Stream," IEEE Std 1849™-2016, Sep. 22, 2016, 50 pages.

IEEE.org [online], "This Car Runs on Code," Feb. 1, 2009, retrieved on Jul. 9, 2021, retrieved from URL<https://spectrum.ieee.org/transportation/systems/this-car-runs-on-code>, 5 pages.

Ingols et al., "Practical Attack Graph Generation for Network Defense," 2006 22nd Annual Computer Security Applications Conference (ACSAC'06), Miami Beach, Florida, Dec. 11-15, 2006, 10 pages.

International Organization for Standardization, "International Standard: ISO/IEC 27001," ISO/IEC 27001:2013(E), Oct. 1, 2013, 29 pages.

Jacobsen et al., "FAIR Principles: Interpretations and Implementation Considerations," Data Intelligence, Jan. 1, 2020, 2(1-2):10-29.

Joint Task Force Transformation Initiative, "Security and Privacy Controls for Federal Information Systems and Organizations," National Institute of Standards and Technology Special Publication 800-53, Revision 4, Jan. 22, 2015, 462 pages.

Kaloroumakis et al., "Toward a Knowledge Graph of Cybersecurity Countermeasures," Technical Report, The MITRE Corporation, 2021, 11 pages.

Khouzani et al., "Scalable min-max multi-objective cyber-security optimization over probabilistic attack graphs", European Journal of Operational Research, Nov. 1, 2019, 278(3):894-903.

Li et al., "Cluster security research involving the modeling of network exploitations using exploitation graphs," Proceedings of the IEEE International Symposium on Cluster Computing and the Grid, Singapore, May 16-19, 2006, 11 pages.

Lippmann et al., "Validating and restoring defense in depth using attack graphs," Proceedings of the Military Communications Conference, Washington, DC, USA, Oct. 23-25, 2006, 10 pages.

Lu et al., "Ranking attack graphs with graph neural networks," Proceedings of the 5th International Conference on Information Security Practice and Experience, Xi'an, China, Apr. 13-15, 2009; Lecture Notes in Computer Science, Apr. 2009, 5451:345-359.

Machado et al., "Data Mesh: Concepts and Principles of a Paradigm Shift in Data Architectures," Procedia Computer Science, 2022, 196:263-271.

Machado et al., "Data-Driven Information Systems: The Data Mesh Paradigm Shift," Presented at Proceedings of the 29th International Conference on Information Systems Development, Valencia, Spain, Sep. 8-10, 2021, 6 pages.

Makridakis, "The forthcoming artificial intelligence (ai) revolution: Its impact on society and firms," Futures, Jun. 2017, 90:46-60.

Manning Free Content Center [online], "Building Your Vocabulary," dated May 19, 2017, retrieved on Jun. 3, 2020, retrieved from URL <https://freecontent.manning.com/building-your-vocabulary/>, 10 pages.

(56) References Cited

OTHER PUBLICATIONS

Martins et al., "A framework for conceptual characterization of ontologies and its application in the cybersecurity domain," Software and Systems Modeling, Jul. 2, 2022, 21:1437-1464.

Martins et al., "Conceptual Characterization of Cybersecurity Ontologies," The Practice of Enterprise Modelling, Nov. 18, 2020, 323-338.

MaschinenMarkt.international [online], "Digital twin in the automobile industry," Aug. 1, 2019, retrieved on Jul. 9, 2021, retrieved from URL<https://www.maschinenmarkt.international/digital-twin-in-the-automobile-industry-a-851549/>, 3 pages.

Mashable.com [online], "Ford ready to innovate, but not at the expense of customer needs," May 31, 2016, retrieved on Jul. 9, 2021, retrieved from URL<https://mashable.com/article/mark-fields-ford-codecon>, 7 pages.

Mathis, "Data lakes," Datenbank-Spektrum, Oct. 6, 2017, 17(3):289-293.

Mehta et al., "Ranking attack graphs," Proceedings of the International Conference on Recent Advances in Intrusion Detection, Hamburg, Germany, Sep. 20-22, 2006; Lecture Notes in Computer Science, Sep. 2006, 4219:127-144.

Mitre.org [online], "CAPEC: Common Attack Pattern Enumerations and Classifications," available on or before Jul. 21, 2007 via Internet Archive: Wayback Machine URL<https://web.archive.org/web/20070721234158/https://capec.mitre.org/>, retrieved on Oct. 4, 2022, retrieved from URL<https://capec.mitre.org/>, 2 pages.

Mitre.org [online], "CWE: Common Weakness Enumeration," available on or before Oct. 9, 2006 via Internet Archive: Wayback Machine URL<https://web.archive.org/web/20061009060144/https://cwe.mitre.org/>, retrieved on Oct. 4, 2022, retrieved from URL<https://cwe.mitre.org/>, 1 page.

MITRE.org [online], "D3FEND," available on or before Jun. 22, 2021 via Internet Archive: Wayback Machine URL<https://web.archive.org/web/20210622142005/https://d3fend.mitre.org/>, retrieved on Jul. 13, 2022, retrieved from URL<https://d3fend.mitre.org/>, 3 pages.

MITRE.org [online], "Digital Artifact Ontology," available on or before Jun. 25, 2021 via Internet Archive: Wayback Machine URL<https://web.archive.org/web/20210625024718/https://d3fend.mitre.org/dao>, retrieved on Jul. 13, 2022, retrieved from URL<https://d3fend.mitre.org/dao/>, 3 pages.

MITRE.org [online], "Service Application," available on or before Jun. 25, 2021 via Internet Archive: Wayback Machine URL<https://web.archive.org/web/20210625024952/https://d3fend.mitre.org/dao/artifact/d3f:ServiceApplication/>, retrieved on Jul. 13, 2022, retrieved from URL<https://d3fend.mitre.org/dao/artifact/d3f:ServiceApplication/>, 1 page.

Monino, "Data Value, Big Data Analytics, and Decision-Making," Journal of the Knowledge Economy, Aug. 20, 2016, 256-267.

Murata, "Petri Nets: Properties, Analysis and Applications," Proceedings of the IEEE, Apr. 1989, 77(4):541-580.

Narmeen Zakaria Bawany; DDOS Attack Detection and Mitigation Using SON: Methods, Practices, and Solutions; Springer-2017; p. 425-441.

National Institute of Standards and Technology [online], "National Vulnerability Database," last updated Jun. 2, 2020, retrieved on Jun. 3, 2020, retrieved from URL<https://nvd.nist.gov/>, 4 pages.

Neo4j.com [online], "Random Walk," available on or before Aug. 6, 2020 via Internet Archive: Wayback Machine URL<https://web.archive.org/web/20200806193136/https://neo4j.com/docs/graph-data-science/current/alpha-algorithms/random-walk/>, retrieved on Jul. 28, 2021, retrieved from URL<https://neo4j.com/docs/graph-data-science/current/alpha-algorithms/random-walk/>, 7 pages.

Neo4j.com [online], "Topological link prediction," available on or before May 17, 2020, via Internet Archive: Wayback Machine URL<https://web.archive.org/web/20200517111258/https://neo4j.com/docs/graph-data-science/current/algorithms/linkprediction/>, retrieved on Jun. 14, 2022, retrieved from URL<https://neo4j.com/docs/graph-data-science/current/algorithms/linkprediction/>, 2 pages.

Neo4j.com [online], "Yen's K-Shortest Paths," available on or before Aug. 6, 2020 via Internet Archive: Wayback Machine URL<https://web.archive.org/web/20200806185626/https://neo4j.com/docs/graph-data-science/current/alpha-algorithms/yen-s-k-shortest-path/, retrieved on Jul. 28, 2021, retrieved from URL<https://web.archive.org/web/20200806185626/https://neo4j.com/docs/graph-data-science/current/alpha-algorithms/yen-s-k-shortest-path/>, 5 pages.

Networks: An Introduction, Newman (ed.), May 2010, 789 pages.

Noel et al., "CyGraph: Graph-Based Analytics and Visualization for Cybersecurity," Handbook of Statistics, Jan. 2016, 35:117-167.

Ortalo et al., "Experimenting with quantitative evaluation tools for monitoring operational security," IEEE Transactions on Software Engineering, Sep./Oct. 1999, 25(5):633-650.

Ou et al., "A Scalable Approach to Attack Graph Generation," Proceedings of the 13th ACM Conference on Computer and Communication Security, Oct. 2006, 336-345.

Ou et al., "MulVAL: A Logic-based Network Security Analyzer," 14th USENIX Security Symposium, Aug. 2005, Baltimore, MD, USA, 16 pages.

Phillips et al., "A graph-based system for network-vulnerability analysis," Proceedings of the 1998 Workshop on New Security Paradigms, Charlottesville, Virginia, Sep. 22-26, 1998, 71-79.

PM4Py.de [online], "DFG: Process Discovery using Directly-Follows Graphs," available on or before Mar. 7, 2019 via Internet Archive: Wayback Machine URL<https://web.archive.org/web/20190307062454/http://pm4py.pads.rwth-aachen.de/documentation/process-discovery/dfg/>, retrieved on Jul. 28, 2021, retrieved from URL<https://web.archive.org/web/20190307062454/http://pm4py.pads.rwth-aachen.de/documentation/process-discovery/dfg/>, 4 pages.

PM4Py.de [online], "Process Discovery," available on or before Jun. 26, 2020 via Internet Archive: Wayback Machine URL<https://web.archive.org/web/20200626094921/https://pm4py.fit.fraunhofer.de/documentation#discovery>, retrieved on Jul. 28, 2021, retrieved from URL<https://pm4py.fit.fraunhofer.de/documentation#discovery>, 5 pages.

Process Mining, 1st ed., van der Aalst, 2011, Chapters 5-6, 63 pages.

Purvine et al., "A Graph-Based Impact Metric for Mitigating Lateral Movement Cyber Attacks", Automated Descision Making for Active Cyber Defence, Oct. 2016, pp. 45-52.

Q. Liu et al., "Latte: Large-Scale Lateral Movement Detection," MILCOM 2018—2018 IEEE Military Communications Conference (MILCOM), 2018, pp. 1-6, doi: 10.1109/MILCOM.2018.8599748. (Year: 2018).

Rossi et al., "Knowledge Graph Embedding for Link Prediction: A Comparative Analysis," arXiv, Feb. 3, 2020, arXiv:2002.00819v1, 42 pages.

Sales et al., "Ontological anti-patterns in taxonomic structures," Presented at Proceedings of ONTOBRAS 2019: XII Seminar on Ontology Research in Brazil, Porto Alegre, Brazil, Sep. 2-5, 2019, 13 pages.

Schatz et al., "Economic valuation for information security investment: a systematic literature review," Information Systems Frontiers, Apr. 18, 2016, 19:1205-1228.

Shandilya et al., "Use of Attack Graphs in Security Systems", Hindawi Journal of Computer Networks and Communications, Oct. 20, 2014, 2014:818957, 14 pages.

Shi et al., "Normalized Cuts and Image Segmentation," IEEE Transactions on Pattern Analysis and Machine Intelligence, Aug. 2000, 22(8):888-905.

Siemens.com [online], "From vehicle design to multi-physical simulations," available on or before Jul. 26, 2019 via Internet Archive: Wayback Machine URL<https://web.archive.org/web/20190726044643/https://new.siemens.com/global/en/markets/automotive-manufacturing/digital-twin-product.html>, retrieved on Jul. 9, 2021, retrieved from URL<https://new.siemens.com/global/en/markets/automotive-manufacturing/digital-twin-product.html>, 11 pages.

Sitton-Candanedo et al., "A review of edge computing reference architectures and a new global edge proposal," Future Generation Computer Systems, Oct. 2019, 99:278-294.

(56) References Cited

OTHER PUBLICATIONS

SMMT.co.uk [online], "Role of Digital Twin in Automotive Industry," Dec. 17, 2018, retrieved on Jul. 9, 2021, retrieved from URL<https://www.smmt.co.uk/2018/12/role-of-digital-twin-in-automotive-industry/>, 9 pages.

Sourceforge.net [online], "XSB," last updated Oct. 29, 2017, retrieved on Jun. 3, 2020, retrieved from URL <http://xsb.sourceforge.net/>, 2 pages.

Stanek et al., "Method of comparing graph differencing algorithms for software differencing," 2008 IEEE International Conference on Electro/Information Technology, Ames, Iowa, May 18-20, 2008, 482-487.

Strom et al., "MITRE ATT&CK™: Design and Philosophy", The MITRE Corporation, Jul. 2018, 37 pages.

Swiler et al., "A graph-based network-vulnerability analysis system," Sandia National Laboratories, 1997, Tech. Rep. SAND97-3010/1, 25 pages.

Tan et al., "Future internet: The Internet of Things," Presented at Proceedings of the 2010 3rd International Conference on Advanced Computer Theory and Engineering (ICACTE), Chengdu, China, Aug. 20-22, 2010.

TechCrunch.com [online], "Tesla is rolling out its Navigate on Autopilot feature," Oct. 27, 2018, retrieved on Jul. 9, 2021, retrieved from URL<https://techcrunch.com/2018/10/26/tesla-is-rolling-out-its-navigate-on-autopilot-feature/>, 17 pages.

The Fourth Industrial Revolution, 1st. ed., Schwab, Jan. 2017, 218 pages.

The MITRE Corporation [online], "MITRE ATT&CK," last updated May 27, 2020, retrieved on Jun. 3, 2020, retrieved from URL <https://attack.mitre.org/>, 3 pages.

Ullah et al., "Towards Modeling Attacker's Opportunity for Improving Cyber Resilience in Energy Delivery Systems", Resilience Week, Aug. 2018, pp. 100-107.

Uschold et al., "Ontologies: Principles, methods and applications," The Knowledge Engineering Review, Jan. 1996, 11(2):93-136.

Van Der Aalst et al., "Causal Nets: A Modeling Language Tailored towards Process Discovery," Presented at Proceedings of CONCUR 2011—Concurrency Theory, Aachen, Germany, Sep. 6-9, 2011; Lecture Notes in Computer Science, Sep. 2011, 6901:28-42.

Van Heijst et al., "Using explicit ontologies in KBS development," International Journal of Human-Computer Studies, Feb. 1997, 46(2-3):183-292.

Vehicle Power Management, 1st ed., Zhang et al.(eds.), Aug. 2011, Chapter 10, 27 pages.

W3.org [online], "SWRL: A Semantic Web Rule Language Combining OWL and RuleML," May 21, 2004, retrieved on Oct. 4, 2022, retrieved from URL<https://www.w3.org/Submission/SWRL/>, 24 pages.

Wand et al., "On the deep structure of information systems," Information Systems Journal, Jul. 1995, 5(3):203-223.

Wang et al., "A Network Vulnerability Assessment Method Based on Attack Graph," 2018 IEEE 4th International Conference on Computer and Communications, Dec. 7-10, 2018, Chengdu, China, 1149-1154.

Wang et al., "Big data analytics in cyber security: network traffic and attacks," Journal of Computer Information Systems, Jan. 2020, 61(3):1-8.

Wang et al., "Exploring Attack Graph for Cost-benefit Security Hardening: A Probabilistic Approach," Computers & Security, Feb. 2013, 32:158-169.

Ward et al., "Threat Analysis and Risk Assessment in Automotive Cyber Security," SAE Int. J. Passeng. Cars Electron. Electr. Systems, May 2013, 6(2):507-513.

Wikipedia.org [online], "5G," last updated Jul. 9, 2021, retrieved on Jul. 9, 2021, retrieved from URL<https://en.wikipedia.org/wiki/5G>, 29 pages.

Wikipedia.org [online], "Active Directory," last updated Jun. 1, 2020, retrieved on Jun. 3, 2020, retrieved from URL <https://en.wikipedia.org/wiki/Active_Directory>, 14 pages.

Wikipedia.org [online], "Backward Chaining," last updated Nov. 16, 2019, retrieved on Jun. 3, 2020, retrieved from URL <https://en.wikipedia.org/wiki/Backward_chaining>, 3 pages.

Wikipedia.org [online], "Breadth-first search," last updated Jul. 21, 2021, retrieved on Jul. 28, 2021, retrieved from URL<https://en.wikipedia.org/wiki/Breadth-first_search>, 6 pages.

Wikipedia.org [online], "Cartesian Product," last updated Feb. 28, 2020, retrieved on Jun. 3, 2020, retrieved from URL <https://en.wikipedia.org/wiki/Cartesian_product>, 9 pages.

Wikipedia.org [online], "Centrality," last updated May 29, 2020, retrieved on Jun. 3, 2020, retrieved from URL <https://en.wikipedia.org/wiki/Centrality>, 15 pages.

Wikipedia.org [online], "Centrality," last updated Oct. 18, 2020, retrieved on Oct. 26, 2020, retrieved from URL<https://en.wikipedia.org/wiki/Centrality>, 15 pages.

Wikipedia.org [online], "Common Vulnerabilities and Exposures," last updated Jul. 6, 2021, retrieved on Jul. 9, 2021, retrieved from URL<https://en.wikipedia.org/wiki/Common_Vulnerabilities_and_Exposures>, 5 pages.

Wikipedia.org [online], "Common Vulnerability Scoring System," last updated Jun. 21, 2021, retrieved on Jul. 9, 2021, retrieved from URL<https://en.wikipedia.org/wiki/Common_Vulnerability_Scoring_System>, 7 pages.

Wikipedia.org [online], "Depth-first search," last updated Jun. 16, 2021, retrieved on Jul. 28, 2021, retrieved from URL<https://en.wikipedia.org/wiki/Depth-first_search>, 8 pages.

Wikipedia.org [online], "Digital twin," last updated Jul. 8, 2021, retrieved on Jul. 9, 2021, retrieved from URL<https://en.wikipedia.org/wiki/Digital_twin>, 13 pages.

Wikipedia.org [online], "Eigenvector centrality," last updated Dec. 1, 2020 retrieved on Jan. 11, 2021, retrieved from URL<https://en.wikipedia.org/wiki/Eigenvector_centrality>, 4 pages.

Wikipedia.org [online], "Flood Fill," last updated Dec. 24, 2019, retrieved on Jun. 3, 2020, retrieved from URL <https://en.wikipedia.org/wiki/Flood_fill>, 7 pages.

Wikipedia.org [online], "Floyd-Warshall algorithm," last updated Jan. 5, 2021, retrieved on Jan. 11, 2021, retrieved from URL<https://en.wikipedia.org/wiki/Floyd%E2%80%93Warshall_algorithm>, 7 pages.

Wikipedia.org [online], "Forward Chaining," last updated Nov. 18, 2019, retrieved on Jun. 3, 2020, retrieved from URL <https://en.wikipedia.org/wiki/Forward_chaining>, 3 pages.

Wikipedia.org [online], "Look-ahead (backtracking)," last updated May 23, 2020, retrieved on Jun. 3, 2020, retrieved from URL <https://en.wikipedia.org/wiki/Look-ahead_(backtracking)>, 3 pages.

Wikipedia.org [online], "Natural language processing," last updated Jun. 10, 2022, retrieved on Jun. 14, 2022, retrieved from URL<https://en.wikipedia.org/wiki/Natural_language_processing>, 13 pages.

Wikipedia.org [online], "Reachability," last updated Oct. 22, 2021, retrieved on Jul. 13, 2022, retrieved from URL<https://en.wikipedia.org/wiki/Reachability>, 5 pages.

Wikipedia.org [online], "SCADA," last updated Jun. 2, 2020, retrieved on Jun. 3, 2020, retrieved from URL <https://en.wikipedia.org/wiki/SCADA>, 12 pages.

Wikipedia.org [online], "Sigmoid function," last updated Dec. 25, 2020, retrieved on Jan. 11, 2021, retrieved from URL<https://en.wikipedia.org/wiki/Sigmoid_function>, 4 pages.

Wikipedia.org [online], "SWOT analysis," last updated Oct. 20, 2020, retrieved on Oct. 26, 2020, retrieved from URL<https://en.wikipedia.org/wiki/SWOT_analysis>, 8 pages.

Wikipedia.org [online], "Traffic congestion," last updated Oct. 5, 2020, retrieved on Oct. 26, 2020, retrieved from URL<https://en.wikipedia.org/wiki/Traffic_congestion>, 24 pages.

Wikipedia.org [online], "Traffic flow," last updated Oct. 19, 2020, retrieved on Oct. 26, 2020, retrieved from URL<https://en.wikipedia.org/wiki/Traffic_flow>, 41 pages.

Wikipedia.org [online], "Zero-day (computing)," last updated Oct. 16, 2020, retrieved on Oct. 26, 2020, retrieved from URL<https://en.wikipedia.org/wiki/Zero-day_(computing)>, 8 pages.

Wu et al., "A service-oriented architecture for business intelligence," Presented at Proceedings of the IEEE International Conference on Service-Oriented Computing and Applications (SOCA '07), Newport Beach, CA, USA, Jun. 19-20, 2007, 279-285.

(56) References Cited

OTHER PUBLICATIONS

X. Li, C. Zhang, T. Jung, J. Qian and L. Chen, "Graph-based privacy-preserving data publication," IEEE Infocom 2016—The 35th Annual IEEE International Conference on Computer Communications, 2016, pp. 1-9, doi: 10.1109/INF000M.2016.7524584. (Year: 2016).

Xie et al., "Using Bayesian Networks for Cyber Security Analysis," Proceedings of the 2010 IEEE/IFIP International Conference on Dependable Systems & Networks, Jun. 28-Jul. 1, 2010, Chicago, Illinois, 211-220.

Yi et al., "Overview on attack graph generation and visualization technology," 2013 International Conference on Anti-Counterfeiting, Security and Identification (ASID), Shanghai, China, Oct. 25-27, 2013, 6 pages.

You et al., "A Review of Cyber Security Controls from an ICS Perspective," Proceedings of 2018 International Conference on Platform Technology and Service (PlatCon), Jan. 29-31, 2018, Jeju, South Korea, 5 pages.

Zeng et al., "Survey of Attack Graph Analysis Methods from the Perspective of Data and Knowledge Processing," Hindawi Security and Communication Networks, Dec. 26, 2019, 2019:2031063, 17 pages.

Zhang et al., "Co-simulation framework for design of time-triggered cyber physical systems," 2013 ACM/IEEE International Conference on Cyber-Physical Systems (ICCPS), Philadelphia, Pennsylvania, Apr. 8-11, 2013, 119-128.

Zhang et al., "Optimal Decision-Making Approach for Cyber Security Defense Using Game Theory and Intelligent Learning," Security and Communication Networks, Dec. 23, 2019, 2019:3038586, 17 pages.

Zhao et al., "Attack graph analysis method for large scale network security hardening," J. Front. Comput. Sci. Technology, 2018, 12(2):263-273 (with English Abstract).

Chen Zhong, Towards Agile Cyber Analysis: Leveraging Visualization as Functions in Collaborative Visual Analytics, IEEE:2017, pp. 1-2.

EP Extended Search Report in European Appln. No. 22187514.9, dated Nov. 29, 2022, 7 pages.

\* cited by examiner

OPTIMIZING ENERGY CONSUMPTION OF PRODUCTION LINES USING INTELLIGENT DIGITAL TWINS

CROSS-REFERENCE TO RELATED APPLICATIONS

This application claims the benefit of and priority to U.S. Prov. App. No. 63/224,130, filed on Jul. 21, 2021, which is expressly incorporated herein by reference in the entirety.

BACKGROUND

Enterprises consistently seek to improve operations and efficiency of their operations. For example, some enterprises employ production lines to provision products and/or services to consumers. Production lines expend energy in their operation. For example, a production line typically includes one or more machines, each of which consumes energy to perform one or more assigned tasks. Energy reduction is not only beneficial in terms of costs incurred by an enterprise, but also to the environment as a whole.

SUMMARY

Implementations of the present disclosure are directed to optimizing energy consumption of physical entities, such as production lines. More particularly, implementations of the present disclosure are directed to a production line optimization (PLO) platform that is used to optimize energy consumption of production lines (e.g., optimizing energy consumption of machines on a production line, collectively). As described in further detail herein, implementations of the present disclosure intelligently optimize production lines in order to reduce energy consumption, subject to operations, products quality, supply chain predictability. In some implementations, this is achieved by mapping between industrial processes to the underlying energy aspect of their supporting modules by generating a process aware energy consumption (PAEC) digital twin of the production lines. The PAEC digital twins each enable advanced analytics to be executed and provisioning of energy saving recommendations that are executed to optimize energy consumption.

In some implementations, actions include receiving data representative of a physical entity, generating an initial knowledge graph representative of a process that is executed by the physical entity based on the data, enriching the initial knowledge graph to provide a process aware energy consumption (PAEC) digital twin of the process as an enriched knowledge graph, providing at least two permutations based on the PAEC digital twin, executing analytics at least partially based on the at least two permutations to provide one or more recommendations, and executing at least one recommendation to optimize energy consumption of the physical entity. Other implementations of this aspect include corresponding systems, apparatus, and computer programs, configured to perform the actions of the methods, encoded on computer storage devices.

These and other implementations can each optionally include one or more of the following features: executing at least one recommendation to optimize energy consumption of the physical entity includes adjusting a configuration of the physical entity from a baseline configuration to a configuration permutation; energy consumption of the physical entity is optimized within constraints of one or more of a service level agreement (SLA) of the process, an outcome of the process, and a risk to the process; actions further include receiving ontology data associated with the process and the physical entity, the ontology data being processed by a digital twin builder to provide the initial knowledge graph; the data includes operational data at least partially including data provided from one or more sensors that are responsive to one or more of operation of the physical entity and an environment that the physical entity operates in; the physical entity includes a production line having one or more energy consuming machines that execute at least a portion of the process; the PAEC digital twin is specific to one or more of a product that is produced by execution of the process and a customer that the process is executed for.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF THE DRAWINGS

Like reference numbers and designations in the various drawings indicate like elements.

DETAILED DESCRIPTION

Implementations of the present disclosure are directed to optimizing energy consumption of physical entities, such as production lines. More particularly, implementations of the present disclosure are directed to a production line optimization (PLO) platform that is used to optimize energy consumption of production lines (e.g., optimizing energy consumption of machines on a production line, collectively). As described in further detail herein, implementations of the present disclosure intelligently optimize production lines in order to reduce energy consumption, subject to operations, products quality, supply chain predictability. In some implementations, this is achieved by mapping between industrial processes to the underlying energy aspect of their supporting modules by generating a process aware energy consumption (PAEC) digital twin of the production lines. The PAEC digital twins each enable advanced analytics to be executed and provisioning of energy saving recommendations that are executed to optimize energy consumption.

In some implementations, actions include receiving data representative of a physical entity, generating an initial knowledge graph representative of a process that is executed by the physical entity based on the data, enriching the initial knowledge graph to provide a process aware energy consumption (PAEC) digital twin of the process as an enriched knowledge graph, providing at least two permutations based on the PAEC digital twin, executing analytics at least partially based on the at least two permutations to provide one or more recommendations, and executing at least one recommendation to optimize energy consumption of the physical entity.

Figure 1:
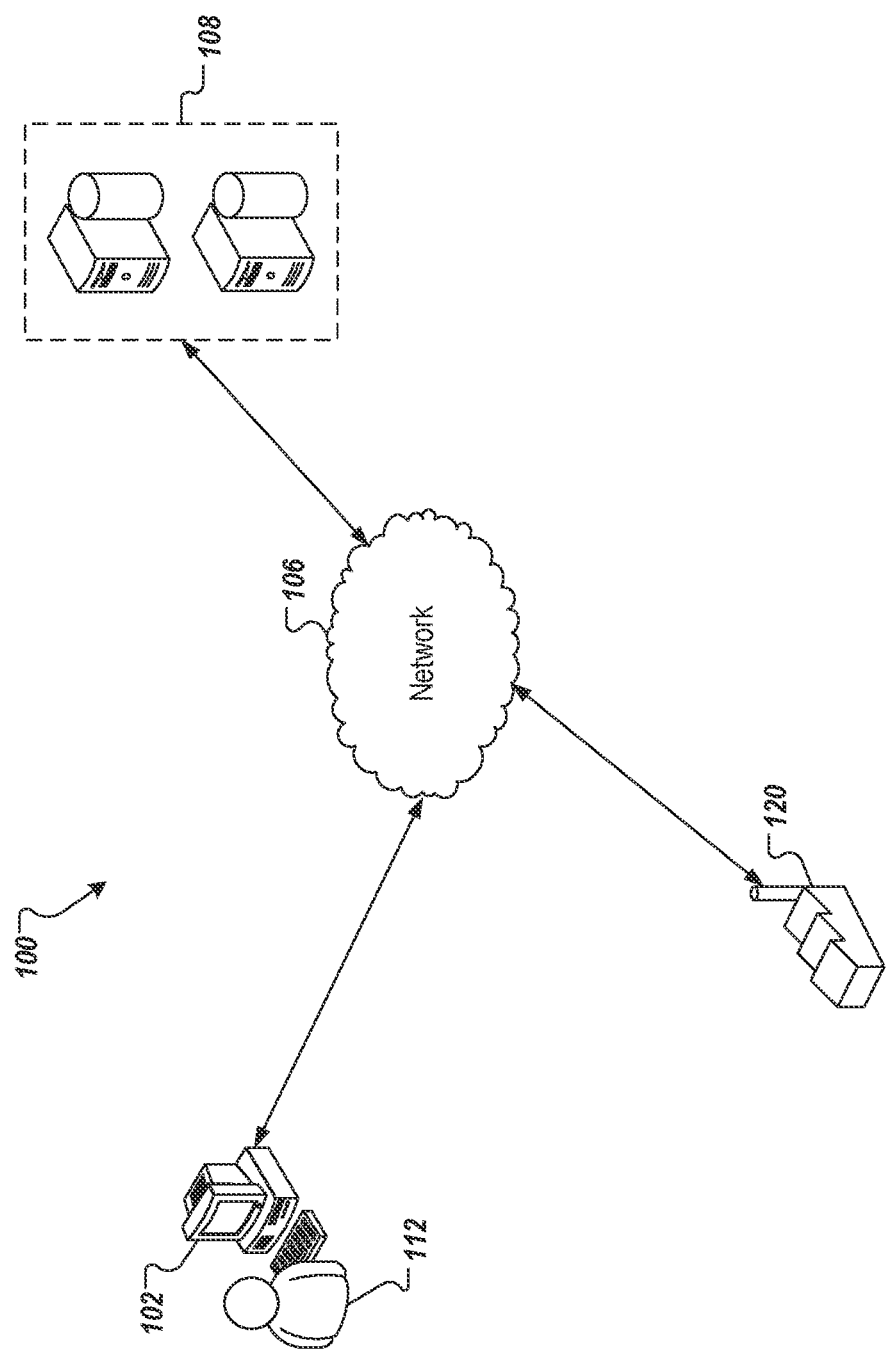
FIG. 1 depicts an example architecture that can be used to execute implementations of the present disclosure.

FIG. 1 depicts an example architecture 100 in accordance with implementations of the present disclosure. In the depicted example, the example architecture 100 includes a client device 102, a network 106, and a server system 108. The server system 108 includes one or more server devices and databases (e.g., processors, memory). In the depicted example, a user 112 interacts with the client device 102.

In some examples, the client device 102 can communicate with the server system 108 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 108 includes at least one server and at least one data store. In the example of FIG. 1, the server system 108 is intended to represent various forms of servers including, but not limited to a web server, an application server, a proxy server, a network server, and/or a server pool. In general, server systems accept requests for application services and provides such services to any number of client devices (e.g., the client device 102 over the network 106). In accordance with implementations of the present disclosure, and as noted above, the server system 108 can host a CDT platform.

In the example of FIG. 1, factory 120 is depicted. The factory 120 represents one or more production lines that are to be optimized using respective PAEC digital twins in accordance with implementations of the present disclosure. In some examples, each production line includes one or more energy consuming devices that operate to perform at least a portion of an industrial process. Example energy consuming devices can include, without limitation, machines and computers. In some examples, each energy consuming device includes a configuration that includes one or more parameters. In some examples, and as described in further detail herein, the configuration controls how the energy consuming device operates and can affect an amount of energy consumed by the energy consuming device.

In some implementations, the PLO platform is hosted within the server system 108, and monitors and is responsive to one or more production lines of the factory 120, as described herein. More particularly, and as described in further detail herein, the PLO platform executes simulations on a PAEC digital twin of the factory 120 to provide analytics, recommendations for energy optimization, and execution of one or more recommendations. In general, a digital twin can be described as a software-implemented replica of a physical entity that captures aspects of the physical entity. In the instant case, the physical entity is production line and/or individual energy consuming devices of the production line, as they relate to one or more processes of an enterprise, and an aspect is energy consumption. A digital twin is unique, because it captures and models the aspect of the energy consumption of a particular physical entity. In short, the digital twin, here, the PAEC digital twin, can be described as an inferencing model of the physical entity.

Figure 2:
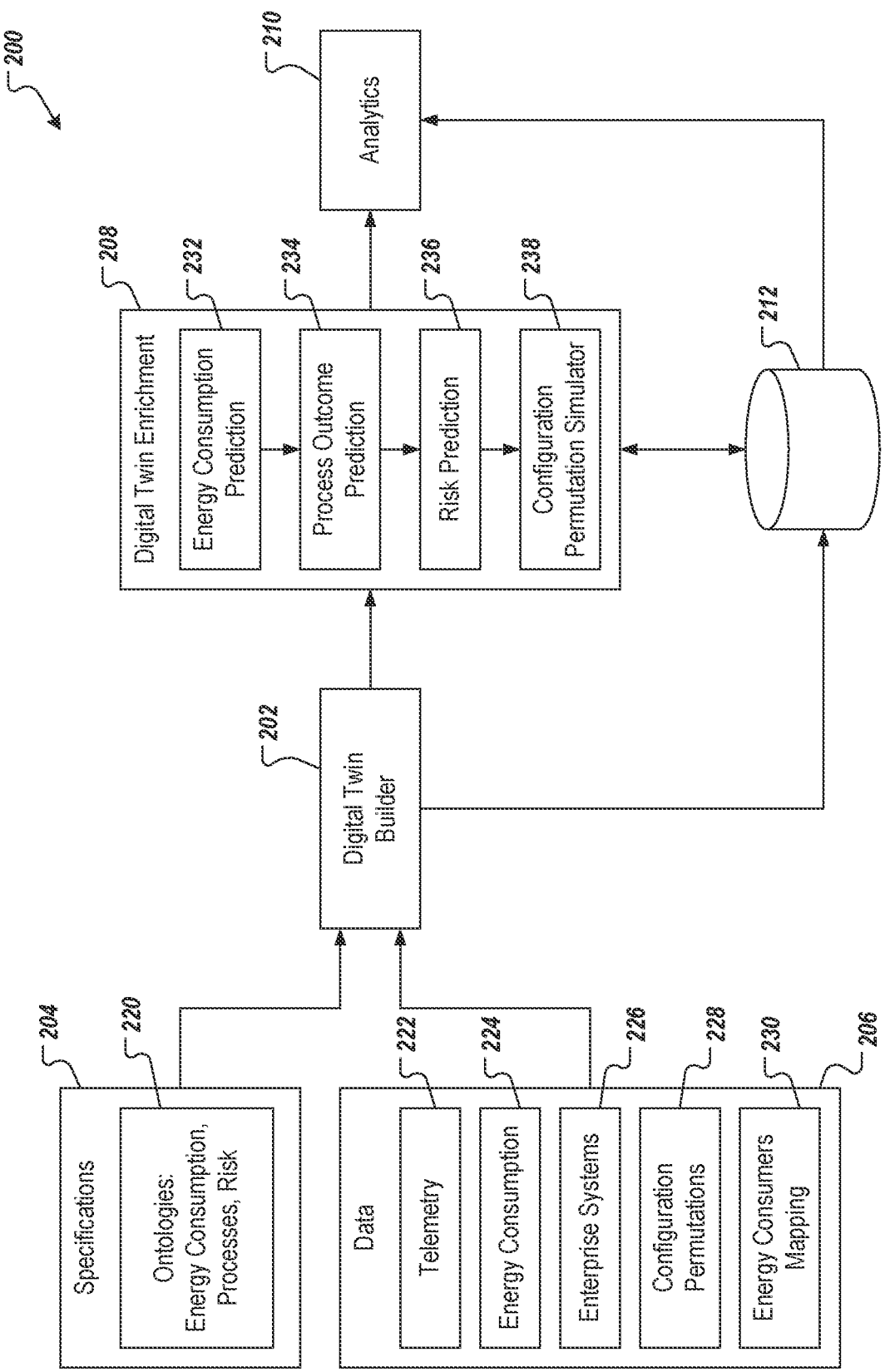
FIG. 2 depicts a conceptual architecture of a production line optimization (PLO) platform in accordance with implementations of the present disclosure.

FIG. 2 depicts a conceptual architecture of a PLO platform 200 in accordance with implementations of the present disclosure. In the example of FIG. 2, the PLO platform 200 includes a digital twin builder 202, a specifications module 204, a data module 206, a digital twin enrichment module 208, an analytics module 210, and a store 212. The specifications module 204 includes an ontologies sub-module 220. The data module 206 includes a telemetry sub-module 222, an energy consumption sub-module 224, an enterprise systems sub-module 226, a configuration permutations sub-module 228, and an energy consumers mapping 230. The digital twin enrichment module 208 includes an energy consumption prediction sub-module 232, a process outcome prediction sub-module 234, a risk prediction sub-module 236, and a configuration permutation simulator 238.

In some implementations, the digital twin builder 202 ingests specification data from the specifications module 204 and operational data from data module 206. In some examples, the specification data is at least partially provided as an ontology that specifies domains of energy consumption, process, and risk. The digital twin builder 202 builds an instance of a knowledge graph using the specification data and the operational data. The knowledge graph instance is loaded to a graph database (e.g., in the store 212).

In general, a knowledge graph can be described as a collection of data and related based on a schema representing entities and relationships between entities. The data can be logically described as a graph (even though also provided in table form), in which each distinct entity is represented by a respective node, and each relationship between a pair of entities is represented by an edge between the nodes. Each edge is associated with a relationship and the existence of the edge represents that the associated relationship exists between the nodes connected by the edge. For example, if a node A represents a person Alpha, a node B represents a person Beta, and an edge E is associated with the relationship "is the father of," then having the edge E connect the nodes in the direction from node A to node B in the graph represents the fact that Alpha is the father of Beta. In some examples, the knowledge graph can be enlarged with schema-related knowledge (e.g., Alpha is a concept Person, Beta is a concept Person, and "is the father of" is a property or relationship between two entities/instances of concept Person). Adding schema-related information supports evaluation of reasoning results.

A knowledge graph can be represented by any of a variety of physical data structures. For example, a knowledge graph can be represented by triples that each represent two entities in order, and a relationship from the first to the second entity; for example, [alpha, beta, is the father of], or [alpha, is the father of, beta], are alternative ways of representing the same fact. Each entity and each relationship can be, and generally will be, included in multiple triples.

In some examples, each entity can be stored as a node once, as a record or an object, for example, and linked through a linked list data structure to all the relationships the entity has, and all the other entities to which the entity is related. More specifically, a knowledge graph can be stored as an adjacency list in which the adjacency information includes relationship information. In some examples, each distinct entity and each distinct relationship are represented with respective, unique identifiers.

The entities represented by a knowledge graph need not be tangible things or specific people. The entities can include particular people, places, things, artistic works, concepts, events, or other types of entities. Thus, a knowledge graph can include data defining relationships between people (e.g., co-stars in a movie); data defining relationships between people and things (e.g., a particular singer recorded a particular song); data defining relationships between places and things (e.g., a particular type of wine comes from a particular geographic location); data defining relationships between people and places (e.g., a particular person was born in a particular city); and other kinds of relationships between entities.

In some implementations, each node has a type based on the kind of entity the node represents; and the types can each have a schema specifying the kinds of data that can be maintained about entities represented by nodes of the type and how the data should be stored. For example, a node of a type for representing a person could have a schema defining fields for information such as birth date, birth place, and so on. Such information can be represented by fields in a type-specific data structure, or by triples that look like node-relationship-node triples (e.g., [person identifier, was born on, date]), or in any other convenient predefined way. In some examples, some or all of the information specified by a type schema can be represented by links to nodes in the knowledge graph, for example, [one person identifier, child of, another person identifier], where the other person identifier is a node in the graph.

In accordance with implementations of the present disclosure, the knowledge graph generated by the digital twin builder 202 is a data structure that represents a process executed by a physical entity (e.g., a production line, an energy consuming device of a production line) to produce a product. Hence, the knowledge graph is described as a digital twin of the process in the context of a physical entity. In some examples, the digital twin is specific to a product that is produced using the physical entity. In some examples, the digital twin is specific to a customer, for which a product is produced using the physical entity. In some examples, the digital twin is specific to the product and the customer. For example, a physical entity can include a first set of configurations that correspond to a first product and/or a first customer, and a second set of configurations that correspond to a second product and/or a second customer.

In some examples, each configuration in a set of configurations is a valid configuration for the particular physical entity, product, and/or customer. For example, a configuration that is incapable of being realized for a particular physical entity (e.g., a configured motor setting that a motor of the physical entity is unable to achieve) is not a valid configuration. As another example, a configuration that results in requirements for a product and/or customer not being achieve is not a valid configuration. In this sense, each configuration in the set of configurations can be described as a configuration permutation with respect to each other. For example, a first configuration in a set of configurations can be valid for the particular physical entity, product, and/or customer, and a second configuration in the set of configurations can also be valid for the particular physical entity, product, and/or customer. In this example, the first configuration is different from the second configuration, so can be described as permutations of one another, but both are still valid for the particular physical entity, product, and/or customer.

In some implementations, the digital twin enrichment module 208 enriches the (initial) knowledge graph to provide an enriched knowledge graph that is stored in the store 212. For example, and as described in further detail herein, the digital twin enrichment module 208 enriches the (initial) knowledge graph with metrics including, but not limited to, an energy consumption metric, a process outcome metric, and a risk metric to provide an enriched knowledge graph that is representative of the process in the context of the physical entity. In some examples, the energy consumption metric is provided as a predicted energy consumption that is generated by an energy consumption predictive model (e.g., executed by the energy consumption prediction sub-module 232). In some examples, the process outcome metric is provided as a predicted process outcome that is generated by a process outcome predictive model (e.g., executed by the process outcome prediction sub-module 234). In some examples, the risk metric is provided as a predicted risk that is generated by a risk predictive model (e.g., executed by the risk prediction sub-module 236).

In some examples, each predictive model (e.g., the energy consumption predictive model, the process outcome predictive model, the risk predictive model) is a machine learning (ML) model that is trained to make respective predictions. In some examples, each ML model is trained using training data that is specific to the particular physical entity, product, and/or customer. In general, training of a ML model includes supervised training, unsupervised training, or semi-supervised training. Training of the ML model can be performed over multiple iterations with each iteration adjusting one or more parameters of the ML model. In some examples, each iteration provides an error value that represents an accuracy of the ML model in providing output based on input from the training data. When the error is determined to be sufficiently low (e.g., zero, below a threshold error) training of the ML model can be determined to be complete.

In further detail, and in some examples, the digital twin enrichment module 208 enriches the initial knowledge graph with the energy consumption metric per customer and/or product. In some examples, with energy consumption metric includes one or more of artificial intelligence (AI)-based transformation from sensor data (e.g., provided by the telemetry sub-module 222) to energy consumption, execution of a transfer function (e.g., provided by a subject matter expert (SME)), and propagation of abstraction levels. That is, the AI-based transformation at least partially includes, the energy consumption predictive model receiving sensor data as input and generating the energy consumption metric as a prediction output by the energy consumption predictive model. In some examples, a transfer function is a function that receives telemetry data for each machine and outputs the an energy consumption for the machine based on the telemetry data. In propagation of abstraction levels, metrics measured within the physical level are propagated to the process level. For example if an activity of a process is related to a machine with energy consumption X, the energy consumption X can be attributed to the process.

In some examples, the digital twin enrichment module 208 also enriches the initial knowledge graph to include a prediction of process element outcome(s). In some examples, enriching the initial knowledge graph prediction of process element outcome(s) includes one or more of AI-based prediction(s), execution of a transfer function (e.g., provided by a SME), and propagation of abstraction levels. In some examples, data of historical executions of processes is correlated with telemetry of machines, the date being labeled with respective outcomes. This data can include event logs, for example. With regard to propagation of abstraction levels in the context of process element outcomes, examples can be considered. In one example, a process has an SLA that is to be compliant with carbon footprint regulations. In this example, the overall carbon footprint of a process can be predicted based on the carbon footprint of each machine propagated to the process level. As another example, a process can have a SLA of minimal quantity to be supplied for a specific lead-time. In the example, metrics of maintenance time of machines measured from the physical level can be predicted, where its impact propagated to the process level.

In some examples, the digital twin enrichment module 208 also enriches the initial knowledge graph to include risk prediction(s) with respect to, for example and without limitation, service level agreement (SLA) anomaly and energy anomaly, and can include, without limitation, propagation of abstraction levels. In some examples, predictive models can be trained based on historical data of process executions (enterprise systems) correlated to process outcomes and machinery telemetry. With regard to propagation of abstract levels in the context of risk, a risk measured over a machine (e.g., a risk of availability loss) is propagated to the activity and then to the process.

Figure 5:
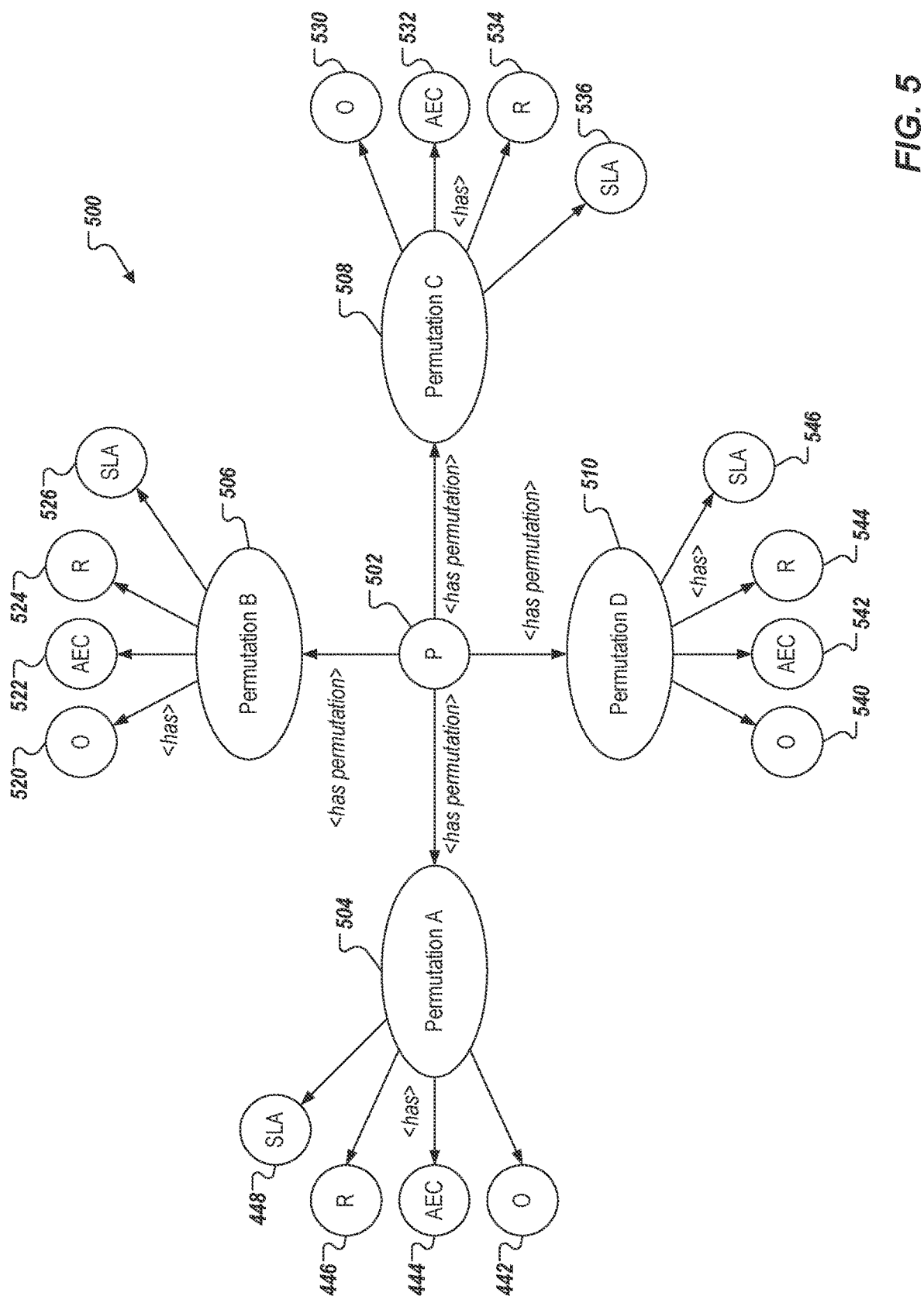
FIG. 5 depicts an example factory permutation simulation using a PAEC digital twin in accordance with implementations of the present disclosure.

In some examples, the digital twin enrichment module 208 also enriches the initial knowledge graph to include configuration permutations (e.g., as discussed in further detail herein with reference to FIG. 5). This can include, for example and without limitation, all possible configuration permutations, all feasible configuration permutations (e.g., SLA vs. machines configuration), user-defined configuration permutations, and external influence/uncertainty. That is, for example, the configuration permutation simulator 238 provides a set of permuted configurations for the physical entity. In some examples, the permuted configurations include configurations in a set of configuration provided from the data module 206, discussed above, as well as permuted configurations generated by the configuration permutation simulator 238 itself.

In some implementations, and as described in further detail herein, an advanced analytics module applies queries to evaluate the PAEC digital twin (i.e., enriched knowledge graph). In some examples, and without limitation, responses to queries can be representative of one or more of what is the predicted energy consumption for a given production line, what is the predicted risk (energy anomaly/SLA anomaly) for a given production line, what is the most energy-effective production line configuration, subject to SLA compliance, and how does supply chain uncertainty affect the above analytics.

For example, and as described in further detail herein, a query can include a SLA, a threshold risk, and/or an outcome. In some examples, the query also indicates a process, a product, and/or a customer. The query can be provided to the analytics module 210 of FIG. 2, which, in response to the query, retrieves a PAEC digital twin (an enriched knowledge graph) from the store 212 that is representative of the process. In some examples, the particular PAEC digital twin is retrieved responsive to the product and/or customer. In some examples, in response to the query, the analytics module 210 retrieves one or more permutations of the PAEC digital twin from the store. In some examples, in response to the query, the analytics module 210 sends a request to the digital twin enrichment module 208 to generate one or more permutations (e.g., by the configuration permutation simulator 238), the digital twin enrichment module 208 providing the one or more permutations to the analytics module 210 in response to the request. The query can be processed across the PAEC digital twin and the permutations. In this sense, the PAEC digital twin itself can be considered a permutation, and a permutation that achieves a minimized energy consumption, while respecting the provided SLA, threshold risk, and/or outcome can be returned.

Figure 3:
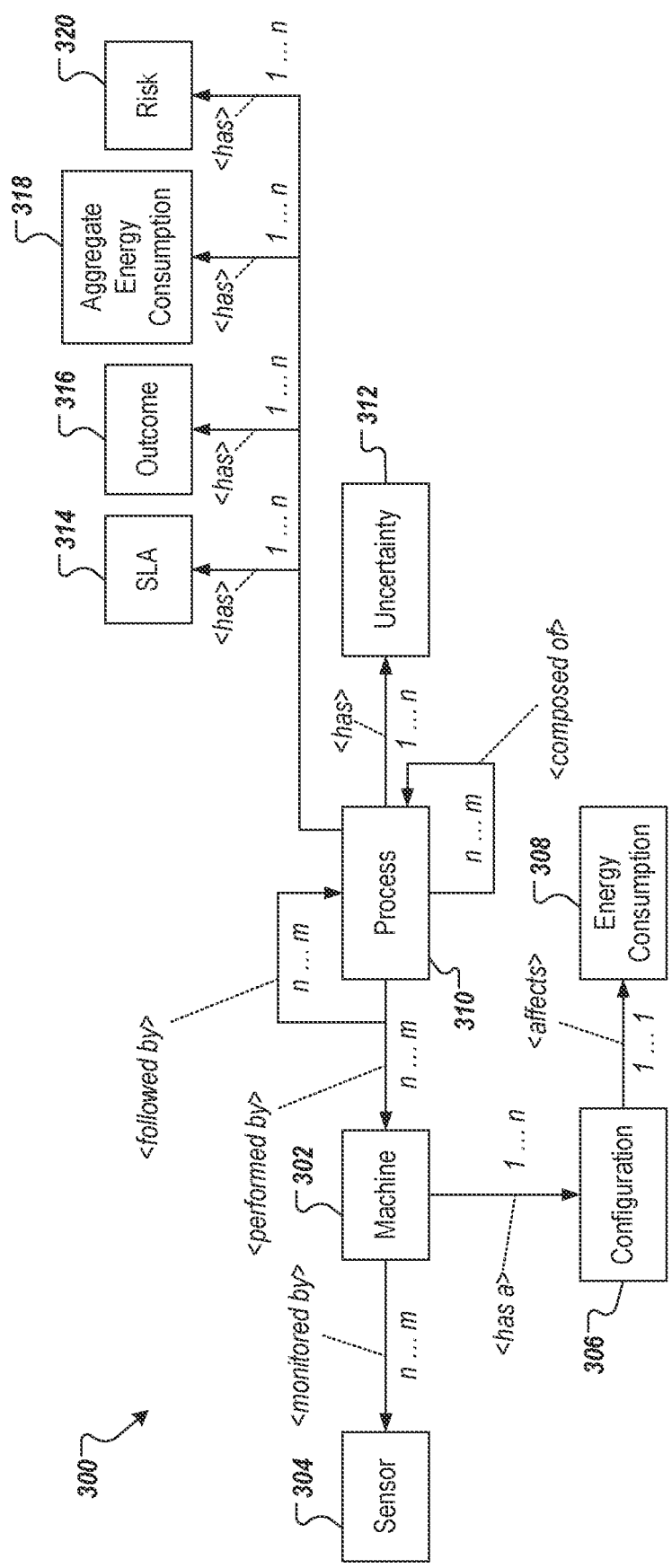
FIG. 3 depicts an example definition model of a process aware energy consumption (PAEC) digital twin accordance with implementations of the present disclosure.

FIG. 3 depicts an example definition model 300 of a PAEC digital twin accordance with implementations of the present disclosure. The example definition model 300 can be described as a knowledge graph model that defines entities and relationships between entities in the context of PAEC of the present disclosure.

In the example of FIG. 3, the example definition model 300 includes a machine entity 302, a sensor entity 304, a configuration entity 306, and an energy consumption entity 308. In some examples, the machine entity 302 represents a physical entity, an energy consuming entity, of a production line. The sensor entity 304 represents a sensor that monitors operation of the physical entity represented by the machine entity 302 and/or a physical environment within which the physical entity operates. For example, operation of a physical entity and/or a physical environment within which the physical entity operates can be monitored by one or more sensors that generate data responsive thereto. The configuration entity 306 represents a configuration of the physical entity represented by the machine entity 302. In some examples, the machine entity 302 can be associated with one or more configuration entities (e.g., representing respective configuration permutations for the physical entity represented by the machine entity 302). Each configuration entity 306 is associated with an energy consumption entity 308. Each energy consumption entity 308 represents an energy consumption of the physical entity (represented by the machine entity 302) for a given configuration (represented by a respective configuration entity 306).

In the example of FIG. 3, the example definition model 300 includes a process entity 310. In some examples, the process entity 310 represents a process executed by one or more physical entities, which are represented by respective machine entities 302. For example, the process entity 310 can represent a manufacturing process that is at least partially executed by one or more physical entities of a production line to produce a product (e.g., a particular product for a particular customer). In some examples, the process represented by the process entity 310 can be a sub-process of a process. In this sense, and as described in further detail herein, multiple process entities 310 can be provided, each process entity 310 representative of a sub-process of an overall process.

In the example of FIG. 3, the example definition model 300 includes an uncertainty entity 312, a SLA entity 314, an outcome entity 316, an aggregate energy consumption entity 318, and a risk entity 312. In some examples, the uncertainty entity 312 represents an uncertainty associated with a process represented by a respective process entity 310. An example uncertainty can include, without limitation, a supply chain uncertainty representative of potential disruptions in a supply chain associated with the process. For example, the supply chain uncertainty can represent a disruption (e.g., a lead time variance) to delivery of one or more sub-components and/or raw materials to be processed during execution of the process. In some examples, the SLA entity 314 represents an SLA associated with the process. In some examples, the outcome entity represents an outcome of execution of the process (e.g., process complete, process failed). In some examples, the aggregate energy consumption entity 318 represents an aggregate energy consumption associated with the process (e.g., energy consumption for all physical entities associated with the process). In some examples, the risk entity 320 represents a risk associated with the process.

Figure 4:
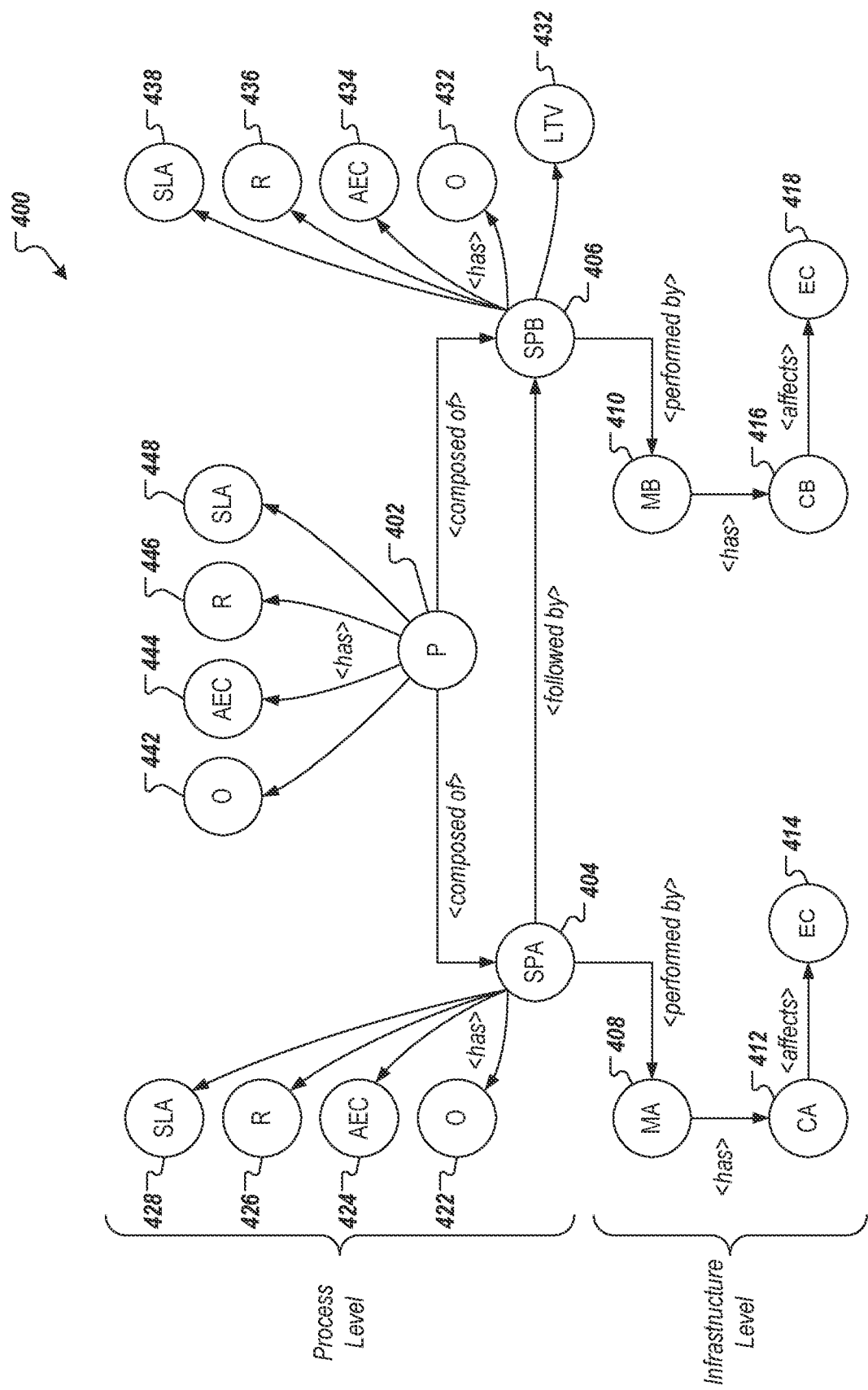
FIG. 4 depicts an example PAEC digital twin for a process in accordance with implementations of the present disclosure.

FIG. 4 depicts an example PAEC digital twin 400 for a process in accordance with implementations of the present disclosure. As described in further detail herein, the example PAEC digital twin 400 follows the example definition model 300 of FIG. 3. More particularly, the PAEC digital twin is an instance of the definition model 300 in that it is populated with data and is enriched to represent a process that is executed by a real-world physical entity.

In the example of FIG. 4, the PAEC digital twin 400 includes a process entity 402 representing a process that is executed in the factory (e.g., production line). In this example, the process includes a first sub-process (SPA), represented by a process entity 404, and a second sub-process (SPB), represented by a process entity 406. The first sub-process is followed by the second sub-process (i.e., the first sub-process is executed, then the second sub-process is executed). The first sub-process is executed by a first physical entity (MA) represented by a machine entity 408 and the second sub-process is executed by a second physical entity (MB) represented by a machine entity 410. The first physical entity has a first configuration (CA), represented by configuration entity 412, that affects a first energy consumption, represented by an energy consumption entity 414. The second physical entity has a second configuration (CB), represented by configuration entity 416, that affects a second energy consumption, represented by an energy consumption entity 418.

The first sub-process is associated with an outcome entity 422, an aggregate energy consumption entity 424, a risk entity 426, and a SLA entity 428. The second sub-process is associated with an uncertainty entity 430 (e.g., lead time variance (LTV)), an outcome entity 432, an aggregate energy consumption entity 434, a risk entity 436, and a SLA entity 438. The process is associated with an outcome entity 442, an aggregate energy consumption entity 444, a risk entity 446, and a SLA entity 448. In some examples, values associated with the outcome entity 442, the aggregate energy consumption entity 444, the risk entity 446, and the SLA entity 448, respectively, are provided based on propagation of respective values associated with the first sub-process and the second sub-process.

As discussed above, implementations of the present disclosure provide permutation simulation for physical entities to evaluate effects of configuration permutations. For example, and as described in further detail herein, an enriched knowledge graph representative of a process executed by a physical entity (e.g., factory, production line) can be processed in view of configuration permutations to permutation knowledge graphs. In some examples, each permutation knowledge graph represents a respective configuration permutation and its resultant effects on the process (e.g., in terms of outcome, aggregate energy consumption, risk).

FIG. 5 depicts an example factory permutation simulation 500 using a PAEC digital twin in accordance with implementations of the present disclosure. The example of FIG. 5 is based on the example PAEC digital twin 400 of FIG. 4. In the example of FIG. 5, the process represented by the PAEC digital twin 400 of FIG. 4 is represented using a process entity 502 and is associated with permutations 504, 506, 508, 510. In some examples, the permutation 504 can be a baseline permutation representative of an initial configuration. In this context, the permutation 504 is associated with the outcome entity 442, the aggregate energy consumption entity 444, the risk entity 446, and the SLA entity 448 of FIG. 4.

In accordance with implementations of the present disclosure, each of the permutations 506, 508, 510 is provided using configuration permutations (i.e., configurations that are permuted with respect to baseline configurations represented by the configuration entities 412, 416 of FIG. 4). Accordingly, each of the permutations 506, 508, 510 is associated with respective characteristics. For example, the permutation 506 is associated with an outcome entity 520, an aggregate energy consumption entity 522, a risk entity 524, and a SLA entity 526, the permutation 508 is associated with an outcome entity 530, an aggregate energy consumption entity 532, a risk entity 534, and a SLA entity 536, and the permutation 510 is associated with an outcome entity 540, an aggregate energy consumption entity 542, a risk entity 544, and a SLA entity 546.

In accordance with implementations of the present disclosure, the permutations can be 504, 506, 508, 510 for analytics on the physical entity. For example, the permutations 504, 506, 508, 510, as respective enriched knowledge graphs, can be queried (e.g., using the analytics module 210 of FIG. 2) to determine a target configuration for the physical entity.

By way of non-limiting example, a query can request a minimum aggregate energy consumption for a given SLA and maximum risk threshold. In response to the query, one or more permutations can by returned, with respective configurations, the one or more permutations providing the minimum aggregate energy consumption, while meeting the SLA and having a risk that is at or is less than the maximum risk threshold. In some examples, a permutation can be selected and a configuration delta can be provided. In some examples, the configuration delta represents a difference between a baseline configuration and a configuration permutation of the selected permutation. In some examples, the baseline configuration can be adjusted based on the configuration delta to achieve the configuration permutation. For example, and without limitation, parameters of one or more physical entities (e.g., energy consuming machines) can be adjusted based on the configuration delta. In this context, the configuration delta can be representative of one or more recommendations for configuration of the physical entity to optimize energy consumption of the physical entity within constraints (e.g., outcome, SLA, risk) of an underlying process.

Figure 6:
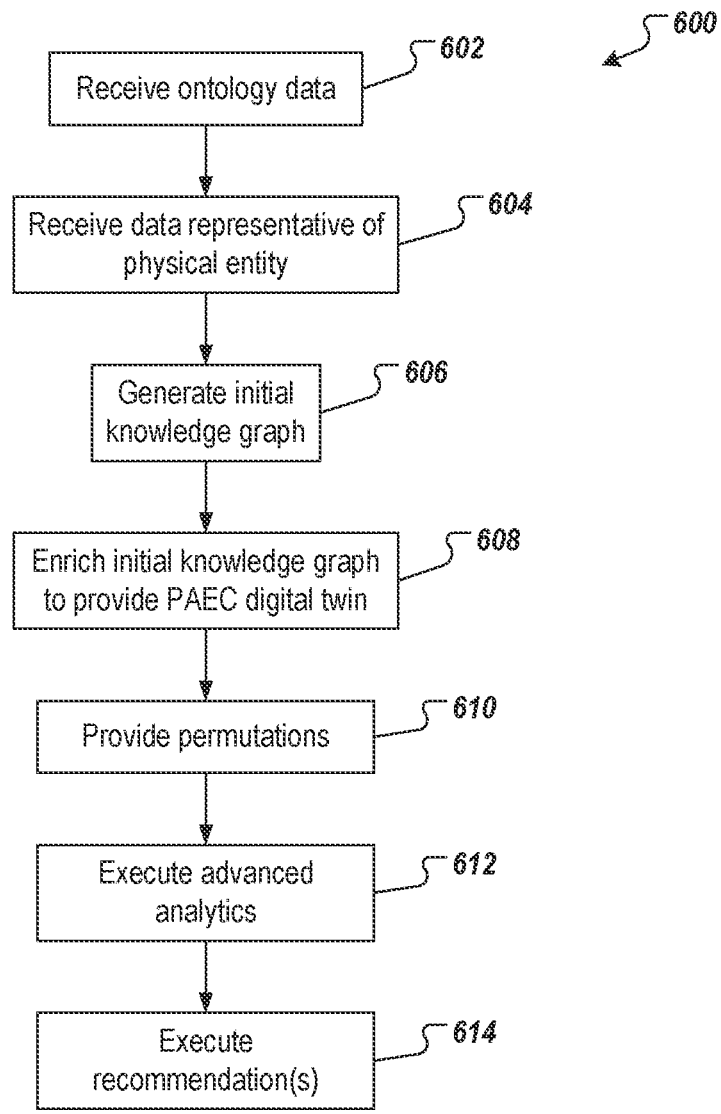
FIG. 6 is a flowchart of an example process that can be executed in accordance with implementations of the present disclosure.

FIG. 6 is a flowchart of an example process 600 that can be executed in accordance with implementations of the present disclosure. In some implementations, the example process 600 may be performed using one or more computer-executable programs executed using one or more computing devices.

Ontology data is received (602). For example, and as described herein, the digital twin builder 202 of FIG. 2 ingests specification data from the specifications module 204, the specification data being at least partially provided as an ontology that specifies domains of energy consumption, process, and risk. Data representative of a physical entity is received (604). For example, and as described herein, the digital twin builder 202 of FIG. 2 ingests operational data from the data module 206, the operational data including telemetry data (e.g., data from one or more sensors), energy consumption data, an enterprise systems data, permutations data, and an energy consumers mapping. An initial knowledge graph is generated (606). For example, and as described herein, the digital twin builder 202 builds an initial knowledge graph using the specification data and the operational data. The knowledge graph instance is loaded to a graph database (e.g., in the store 212).

The initial knowledge graph is enriched to provide a PAEC digital twin of the physical entity (608). For example, and as described herein, the digital twin enrichment module 208 enriches the initial knowledge graph to provide an enriched knowledge graph that is stored in the store 212. For example, the digital twin enrichment module 208 enriches the initial knowledge graph with metrics including, but not limited to, an energy consumption metric, a process outcome metric, and a risk metric to provide an enriched knowledge graph that is representative of the process in the context of the physical entity. Two or more permutations are provided (610). For example, and as described herein, the configuration permutation simulator 238 provides a set of permuted configurations for the physical entity, the permuted configurations including configurations in a set of configuration provided from the data module 206, discussed above, as well as permuted configurations generated by the configuration permutation simulator 238 itself.

Analytics are executed using the permutations (612) and at least one recommendation is executed (614). For example, and as described herein, a query can be submitted to the analytics module 210, which processes the query in view of the permutations to provide one or more recommendations, each recommendation including a potential configuration of the physical entity and expected aggregate energy consumption in the context of a process (e.g., characteristics of the process, such as outcome, risk, SLA). For example, the query can include a minimum aggregate energy consumption for a given SLA and maximum risk threshold. In response to the query, one or more permutations can by returned, with respective configurations, the one or more permutations providing the minimum aggregate energy consumption, while meeting the SLA and having a risk that is at or is less than the maximum risk threshold. In some examples, a permutation can be selected and a configuration delta can be provided. In some examples, the configuration delta represents a difference between a baseline configuration and a configuration permutation of the selected permutation. In some examples, the baseline configuration can be adjusted based on the configuration delta to achieve the configuration permutation. For example, and without limitation, parameters of one or more physical entities (e.g., energy consuming machines) can be adjusted based on the configuration delta. In this context, the configuration delta can be representative of a recommendation for configuration of the physical entity to optimize energy consumption of the physical entity within constraints (e.g., outcome, SLA, risk) of the underlying process.

Implementations of the present disclosure achieve one or more technical advantages. For example, and as described herein, data is originated as a knowledge graph in which embedded semantics are used to the propagation and prediction tasks. In some examples, after a knowledge graph is built and recorded, all information is connected in a way that it is time- and resource-efficient to extract. Furthermore, this enables discovery of cases with a serendipity effect. For example, to infer an activity is at risk despite the fact that there is no a direct threat to the activity. In another example, implementations of the present disclosure provide multiple channels to propagate the risk (or other measures) from a lower abstraction layer towards a higher abstraction layer.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for optimizing energy consumption of physical entities, the computer-implemented method comprising:
  receiving data representative of a physical entity;
  generating an initial knowledge graph representative of a process that is executed by the physical entity based on the data;
  enriching the initial knowledge graph to provide a process aware energy consumption (PAEC) digital twin of the process as an enriched knowledge graph;
  providing at least two permutations based on the PAEC digital twin;
  executing analytics at least partially based on the at least two permutations to provide one or more recommendations; and
  executing at least one recommendation to optimize energy consumption of the physical entity.

2. The method of claim 1, wherein executing at least one recommendation to optimize energy consumption of the physical entity comprises adjusting a configuration of the physical entity from a baseline configuration to a configuration permutation.

3. The method of claim 1, wherein energy consumption of the physical entity is optimized within constraints of one or more of a service level agreement (SLA) of the process, an outcome of the process, and a risk to the process.

4. The method of claim 1, further comprising receiving ontology data associated with the process and the physical entity, the ontology data being processed by a digital twin builder to provide the initial knowledge graph.

5. The method of claim 1, wherein the data comprises operational data at least partially comprising data provided from one or more sensors that are responsive to one or more of operation of the physical entity and an environment that the physical entity operates in.

6. The method of claim 1, wherein the physical entity comprises a production line comprising one or more energy consuming machines that execute at least a portion of the process.

7. The method of claim 1, wherein the PAEC digital twin is specific to one or more of a product that is produced by execution of the process and a customer that the process is executed for.

8. A non-transitory computer-readable storage medium coupled to one or more processors and having instructions stored thereon which, when executed by the one or more processors, cause the one or more processors to perform operations for optimizing energy consumption of physical entities, the operations comprising:
   receiving data representative of a physical entity;
   generating an initial knowledge graph representative of a process that is executed by the physical entity based on the data;
   enriching the initial knowledge graph to provide a process aware energy consumption (PAEC) digital twin of the process as an enriched knowledge graph;
   providing at least two permutations based on the PAEC digital twin;
   executing analytics at least partially based on the at least two permutations to provide one or more recommendations; and
   executing at least one recommendation to optimize energy consumption of the physical entity.

9. The non-transitory computer-readable storage medium of claim 8, wherein executing at least one recommendation to optimize energy consumption of the physical entity comprises adjusting a configuration of the physical entity from a baseline configuration to a configuration permutation.

10. The non-transitory computer-readable storage medium of claim 8, wherein energy consumption of the physical entity is optimized within constraints of one or more of a service level agreement (SLA) of the process, an outcome of the process, and a risk to the process.

11. The non-transitory computer-readable storage medium of claim 8, wherein operations further comprise receiving ontology data associated with the process and the physical entity, the ontology data being processed by a digital twin builder to provide the initial knowledge graph.

12. The non-transitory computer-readable storage medium of claim 8, wherein the data comprises operational data at least partially comprising data provided from one or more sensors that are responsive to one or more of operation of the physical entity and an environment that the physical entity operates in.

13. The non-transitory computer-readable storage medium of claim 8, wherein the physical entity comprises a production line comprising one or more energy consuming machines that execute at least a portion of the process.

14. The non-transitory computer-readable storage medium of claim 8, wherein the PAEC digital twin is specific to one or more of a product that is produced by execution of the process and a customer that the process is executed for.

15. A system, comprising:
   a computing device; and
   a computer-readable storage device coupled to the computing device and having instructions stored thereon which, when executed by the computing device, cause the computing device to perform operations for optimizing energy consumption of physical entities, the operations comprising:
      receiving data representative of a physical entity;
      generating an initial knowledge graph representative of a process that is executed by the physical entity based on the data;
      enriching the initial knowledge graph to provide a process aware energy consumption (PAEC) digital twin of the process as an enriched knowledge graph;
      providing at least two permutations based on the PAEC digital twin;
      executing analytics at least partially based on the at least two permutations to provide one or more recommendations; and
      executing at least one recommendation to optimize energy consumption of the physical entity.

16. The system of claim 15, wherein executing at least one recommendation to optimize energy consumption of the physical entity comprises adjusting a configuration of the physical entity from a baseline configuration to a configuration permutation.

17. The system of claim 15, wherein energy consumption of the physical entity is optimized within constraints of one or more of a service level agreement (SLA) of the process, an outcome of the process, and a risk to the process.

18. The system of claim 15, wherein operations further comprise receiving ontology data associated with the process and the physical entity, the ontology data being processed by a digital twin builder to provide the initial knowledge graph.

19. The system of claim 15, wherein the data comprises operational data at least partially comprising data provided from one or more sensors that are responsive to one or more of operation of the physical entity and an environment that the physical entity operates in.

20. The system of claim 15, wherein the physical entity comprises a production line comprising one or more energy consuming machines that execute at least a portion of the process.

* * * * *